(12) United States Patent
Hiramatsu et al.

(10) Patent No.: US 10,628,574 B2
(45) Date of Patent: Apr. 21, 2020

(54) NON-TRANSITORY COMPUTER-READABLE RECORDING MEDIUM, COMMUNICATION MANAGEMENT METHOD, AND COMMUNICATION MANAGEMENT DEVICE

(71) Applicant: FUJITSU LIMITED, Kawasaki-shi, Kanagawa (JP)

(72) Inventors: Junya Hiramatsu, Yokohama (JP); Ryohei Morishita, Yokohama (JP); Toshinori Tanaka, Yokohama (JP); Kan Yamamoto, Numazu (JP); Yuriko Koseki, Kawasaki (JP); Hiroyoshi Kasai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 15/716,609

(22) Filed: Sep. 27, 2017

(65) Prior Publication Data
US 2018/0096128 A1   Apr. 5, 2018

(30) Foreign Application Priority Data

Sep. 30, 2016   (JP) .................................. 2016-193703

(51) Int. Cl.
*G06F 21/43* (2013.01)
*H04W 12/06* (2009.01)
*H04W 92/24* (2009.01)

(52) U.S. Cl.
CPC ............ *G06F 21/43* (2013.01); *H04W 12/06* (2013.01); *H04W 92/24* (2013.01)

(58) Field of Classification Search
CPC ........ G06F 21/43; H04W 12/06; H04W 92/24
(Continued)

(56) References Cited

U.S. PATENT DOCUMENTS

| | | | |
|---|---|---|---|
| 9,756,094 B1 * | 9/2017 | Lewis | ................. H04L 65/4084 |
| 2007/0162392 A1 * | 7/2007 | McEnroe | ................ G06F 21/10 |
| | | | 705/51 |

(Continued)

FOREIGN PATENT DOCUMENTS

| | | |
|---|---|---|
| JP | H09-265443 | 10/1997 |
| JP | 2013-114622 | 6/2013 |
| JP | 2014-153917 | 8/2014 |

*Primary Examiner* — Abu S Sholeman
(74) *Attorney, Agent, or Firm* — Fujitsu Patent Center

(57) ABSTRACT

A non-transitory computer-readable recoding medium having stored therein a communication management program that causes a communication management device to execute a process. The process includes authenticating a terminal in response to an authentication request from the terminal, receiving a communication content destined to a communication target system, the communication target system sharing access-authentication information with the communication management device, adding a first information with the communication content, the first information corresponding to a result of the authentication request, detecting whether the communication content includes a second information that is identified by the communication target system as information added by the communication management device, deleting the second information when the second information is detected in the communication content; and transmitting the communication content to the communication target system.

8 Claims, 19 Drawing Sheets

(58) Field of Classification Search
USPC .......................................................... 713/176
See application file for complete search history.

(56) References Cited

U.S. PATENT DOCUMENTS

| | | | |
|---|---|---|---|
| 2007/0162932 A1* | 7/2007 | Mickle ................. | H04N 21/254 |
| | | | 725/37 |
| 2007/0204313 A1* | 8/2007 | McEnroe ........... | H04N 7/17336 |
| | | | 725/95 |
| 2008/0140630 A1* | 6/2008 | Sato .................... | G06F 16/2454 |
| 2010/0107225 A1* | 4/2010 | Spencer ............. | H04L 63/0876 |
| | | | 726/4 |

* cited by examiner

| NO. | USER ID | AUTHENTICATION TOKEN |
|---|---|---|
| 1 | user0001 | 43j;iojrugj98wertjp3j54p94t;sfdjg |
| 2 | user0002 | adfffff;jkleiofoa;jf;ejoea;j;iodsjf;aiosd |
| 3 | user0003 | 2;lkdjf;aoisdfj:aioejf |

F I G. 3

| NO. | API ENTRY | BACK-END URL | PARAMETER USED FOR AUTHENTICATION |
|---|---|---|---|
| 1 | myGyoumu | https://BACKENDSYSTEM/gyoumu | HEADER : X-API-USERID |
| 2 | aaaGyoumu | https://BACKENDSYSTEM2/aaa | QUERY : X-API-USER |
| 3 | bbbGyoumu | https://BACKENDSYSTEM2/bbb | HEADER : USER |

F I G. 4

```
COMMUNICATION DATA TRANSMITTED FROM TERMINAL TO COMMUNICATION
MANAGEMENT DEVICE

URL     https://APIGATEWAY.com/myGyoumu

HEADER  APIGATEWAY-TOKEN: 43j;iojrugj98wertjp3j54p94t;sfdjg
            X-API-USERID: gyoumuID BODY    {"adress":"kanagawa", "detail":"aaaaa.."}
```

```
COMMUNICATION DATA TRANSMITTED FROM COMMUNICATION MANAGEMENT
DEVICE TO BACK-END SYSTEM

URL     https://BACKENDSYSTEM/gyoumu

HEADER  X-API-USERID: user0001

BODY    {"adress":"kanagawa", "detail":"aaaaa.."}
```

F I G. 6

```
COMMUNICATION DATA TRANSMITTED FROM TERMINAL TO COMMUNICATION
MANAGEMENT DEVICE

URL
https://APIGATEWAY.com/aaaGyoumu?X-API-USER=gyoumuID

HEADER APIGATEWAY-TOKEN: 43j;iojrugj98wertjp3j54p94t;sfdjg

BODY  {"adress":"kanagawa", "detail":"aaaaa.."}
```

⇩

```
COMMUNICATION DATA TRANSMITTED FROM COMMUNICATION MANAGEMENT
DEVICE TO BACK-END SYSTEM

URL
https://BACKENDSYSTEM2/aaa?X-API-USER=user0001

HEADER

BODY  {"adress":"kanagawa", "detail":"aaaaa.."}
```

FIG. 7

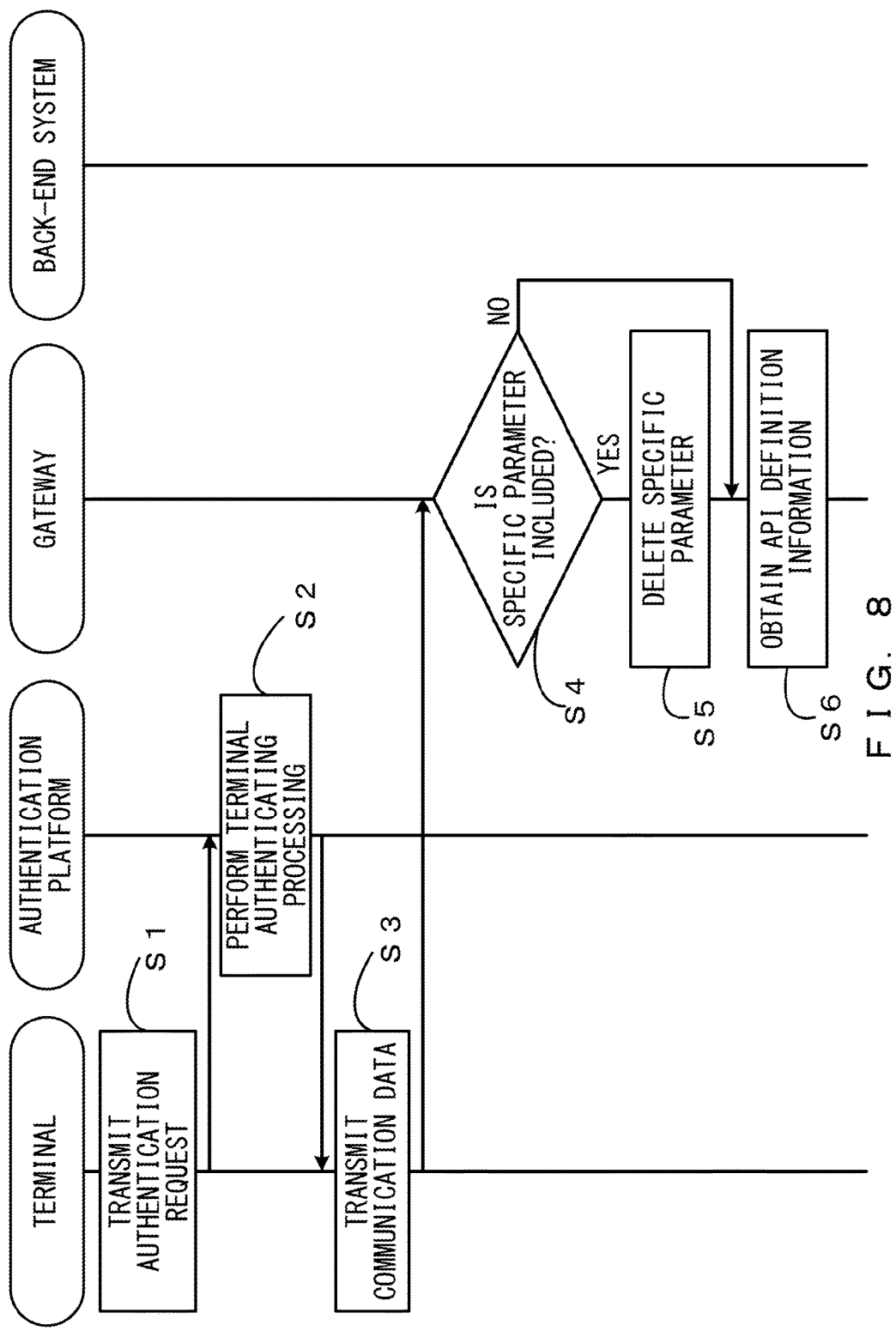

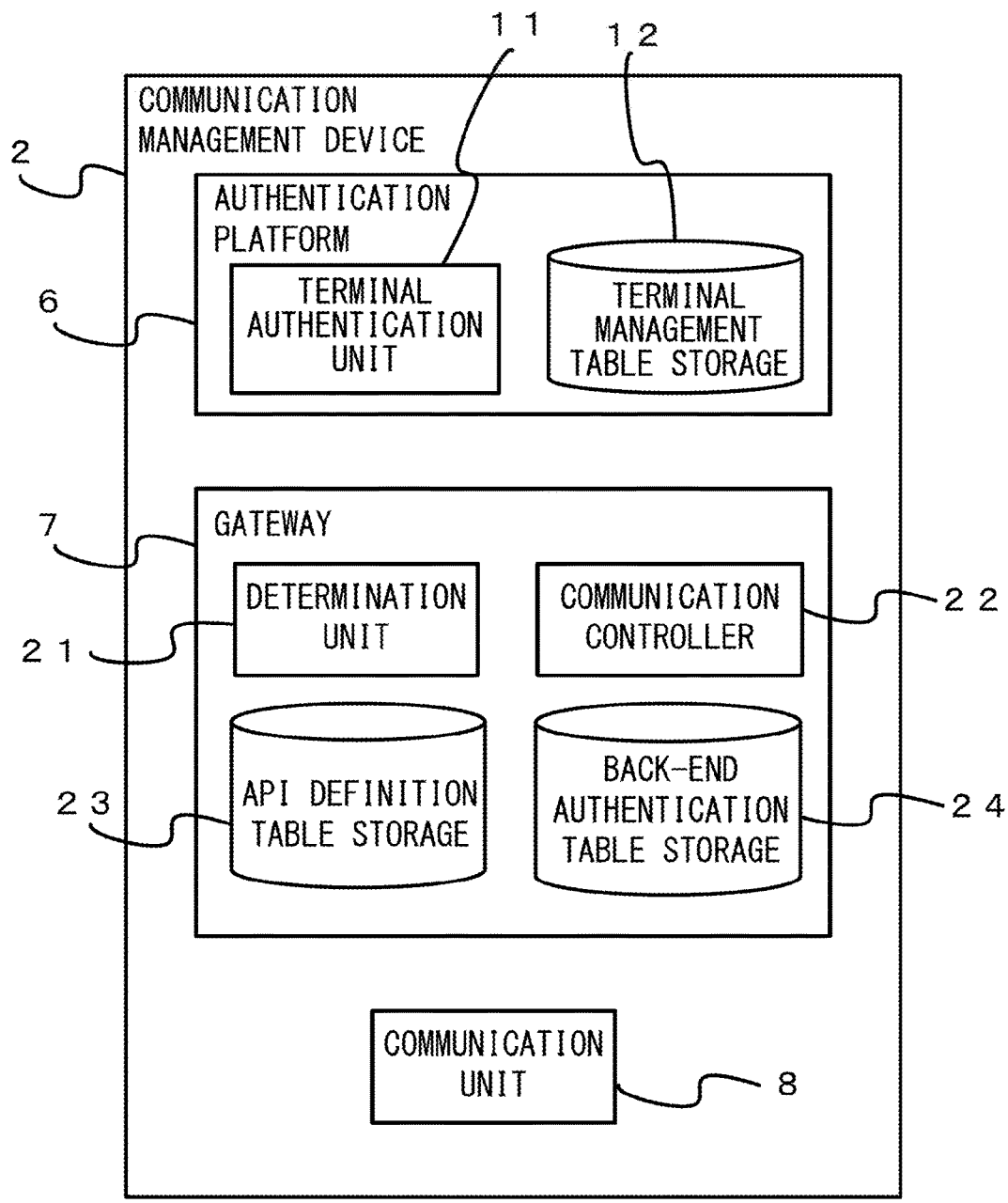
F I G. 10

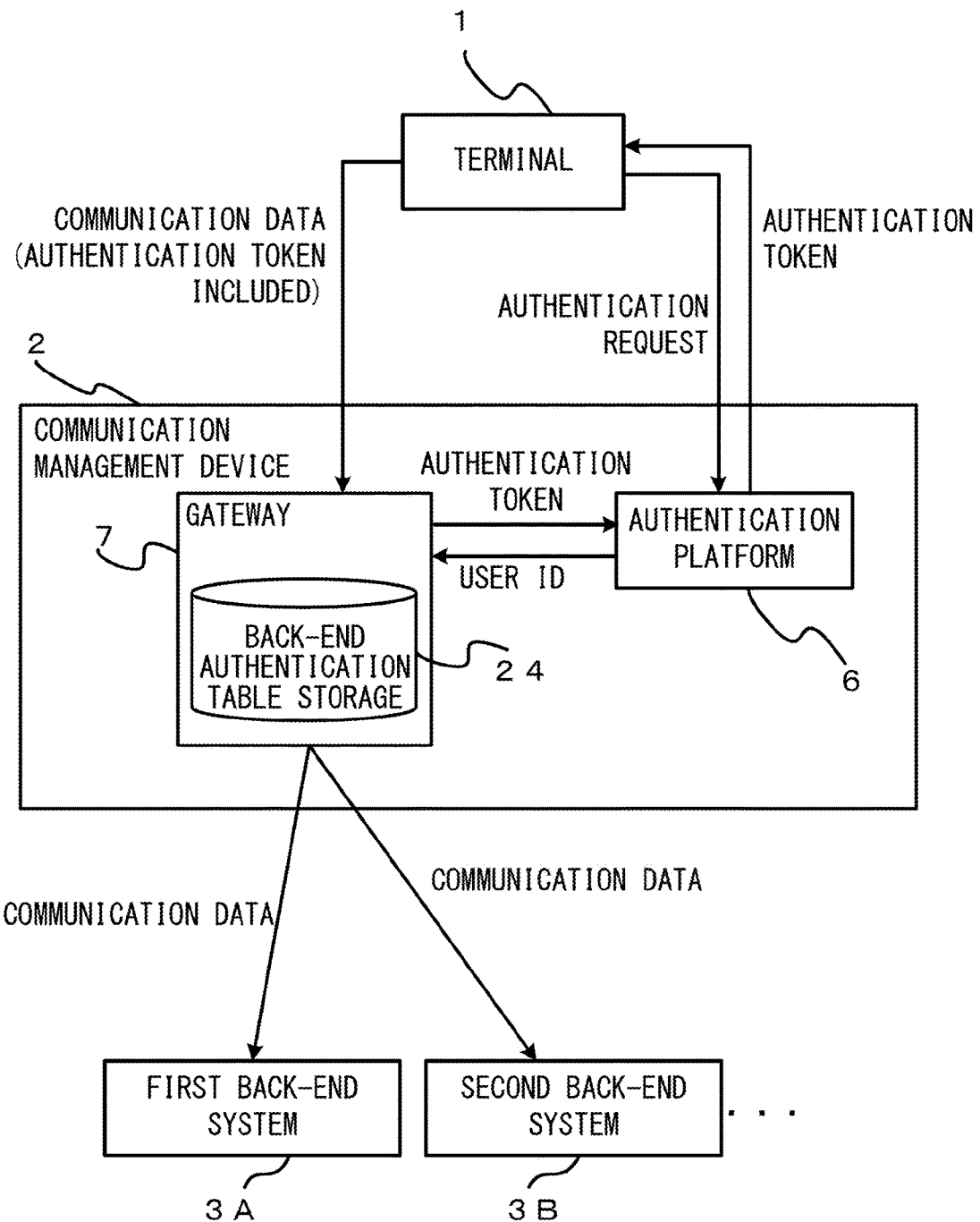
F I G. 1 1

| NO. | API ENTRY | BACK-END URL | PARAMETER USED FOR AUTHENTICATION |
|---|---|---|---|
| 1 | myGyoumu | https://BACKENDSYSTEM/gyoumu | HEADER : X-API-USERID, X-API-USERPASS |
| 2 | aaaGyoumu | https://BACKENDSYSTEM2/aaa | QUERY : X-API-USER, X-API-PASS |
| 3 | bbbGyoumu | https://BACKENDSYSTEM2/bbb | HEADER : USER, PASS |

F I G. 1 2

| NO. | USER ID | BACK-END USER ID | BACK-END PASSWORD | BACK-END TOKEN |
| --- | --- | --- | --- | --- |
| 1 | user0001 | backendUser0001 | backendPassword0001 | asdfjpaoiefj;as |
| 2 | user0002 | backendUser0002 | backendPassword0002 | bj;iorjg;asrj |
| 3 | user0003 | backendUser0003 | backendPassword0003 | c;ajge;osiajg;sd |

FIG. 13

```
COMMUNICATION DATA TRANSMITTED FROM TERMINAL TO COMMUNICATION
MANAGEMENT DEVICE

URL     https://APIGATEWAY.com/myGyoumu

HEADER  APIGATEWAY-TOKEN: 43j;iojrugj98wertjp3j54p94t;sfdjg
          X-API-USERID: gyoumuID
          X-API-USERPASS: gyoumuPass BODY    {"adress":"kanagawa", "detail":"aaaaa.."}
```

```
COMMUNICATION DATA TRANSMITTED FROM COMMUNICATION MANAGEMENT
DEVICE TO BACK-END SYSTEM

URL     https://BACKENDSYSTEM/gyoumu

HEADER  X-API-USERID: backendUser0001
          X-API-USERPASS: backendPassword0001

BODY    {"adress":"kanagawa", "detail":"aaaaa.."}
```

FIG. 14

```
COMMUNICATION DATA TRANSMITTED FROM TERMINAL TO COMMUNICATION
MANAGEMENT DEVICE

URL     https://APIGATEWAY.com/aaaGyoumu?X-API-
USER=gyoumuID&X-API-PASS=gyoumuPass HEADER  APIGATEWAY-TOKEN: 43j;iojrugj98wertjp3j54p94t;sfdjg BODY    {"adress":"kanagawa", "detail":"aaaaa.."}
```

```
COMMUNICATION DATA TRANSMITTED FROM COMMUNICATION MANAGEMENT
DEVICE TO BACK-END SYSTEM

URL     https://BACKENDSYSTEM2/aaa?X-API-
USER=backendUser0001&X-API-PASS=backendUser0001

HEADER

BODY    {"adress":"kanagawa", "detail":"aaaaa.."}
```

F I G. 1 5

```
COMMUNICATION DATA TRANSMITTED FROM TERMINAL TO COMMUNICATION
MANAGEMENT DEVICE

URL    https://APIGATEWAY.com/myGyoumu?X-API-
    USERID=gyoumuID&X-API-USERPASS=gyoumuPass HEADER APIGATEWAY-TOKEN:43j;iojrugj98wertjp3j54p94t;sfdjg
           X-API-USERID:  gyoumuID
           X-API-USERPASS: gyoumuPass BODY   {"adress":"kanagawa", "detail":"aaaaa.."}
```

```
COMMUNICATION DATA TRANSMITTED FROM COMMUNICATION MANAGEMENT
DEVICE TO BACK-END SYSTEM

URL    https://BACKENDSYSTEM/gyoumu?X-API-
    USER=gyoumuID&X-API-PASS=gyoumuPass HEADER X-API-USERID:  backendUser0001
           X-API-USERPASS: backendPassword0001

BODY   {"adress":"kanagawa", "detail":"aaaaa.."}
```

FIG. 17

NON-TRANSITORY COMPUTER-READABLE RECORDING MEDIUM, COMMUNICATION MANAGEMENT METHOD, AND COMMUNICATION MANAGEMENT DEVICE

CROSS-REFERENCE TO RELATED APPLICATION

This application is based upon and claims the benefit of priority of the prior Japanese Patent Applications No. 2016-193703, filed on Sep. 30, 2016, the entire contents of which are incorporated herein by reference.

FIELD

The embodiments discussed herein are related to a non-transitory computer-readable recording medium, a communication management method, and a communication management device.

BACKGROUND

For example, services provided by a plurality of companies may be used by an application executed by a terminal of a user. In this case, the application logs into a target system (a communication target system) and communicates with the communication target system. When a login to the communication target system is performed, an authentication is performed using, for example, an identification (ID).

Patent Document 1: Japanese Laid-open Patent Publication No. 2014-153917
Patent Document 2: Japanese Laid-open Patent Publication No. 2013-114622
Patent Document 3: Japanese Laid-open Patent Publication No. 09-265443

SUMMARY

According to an aspect of the embodiments, a non-transitory computer-readable recoding medium having stored therein a communication management program that causes a communication management device to execute a process. The process includes authenticating a terminal in response to an authentication request from the terminal, receiving a communication content destined to a communication target system, the communication target system sharing access-authentication information with the communication management device, adding a first information with the communication content, the first information corresponding to a result of the authentication request, detecting whether the communication content includes a second information that is identified by the communication target system as information added by the communication management device, deleting the second information when the second information is detected in the communication content; and transmitting the communication content to the communication target system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a terminal management table;
FIG. 4 illustrates an example of an API definition table;
FIG. 6 illustrates an example of pieces of communication data (Part 1) according to the embodiments;
FIG. 7 illustrates an example of the pieces of communication data (part 2) according to the embodiments;
FIG. 8 is part 1 of a sequence diagram that illustrates an example of a flow of processing according to the embodiments;
FIG. 10 illustrates an example of the communication management device according to a variation;
FIG. 11 illustrates an example of a flow of data according to the variation;
FIG. 12 illustrates an example of an API definition table according to the variation;
FIG. 13 illustrates an example of a back-end authentication table;
FIG. 14 illustrates an example of pieces of communication data (Part 1) according to the variation;
FIG. 15 illustrates an example of the pieces of communication data (part 2) according to the variation;
FIG. 17 illustrates an example of pieces of communication data in which a header and a query include authentication-related information.

DESCRIPTION OF EMBODIMENTS

There exists a configuration in which, when an application executed by a terminal of a user logs into each communication target system, the application does not use a different ID for each communication target system, but logs into a plurality of communication target systems by authenticating a specific system (an authentication-information-based cooperation system).

The authentication-information-based cooperation system controls a communication from a terminal to each communication target system on the basis of authentication information received from the terminal. In this case, the authentication-information-based cooperation system transmits authentication information to each of the plurality of communication target systems.

The authentication information is different authentication information than the authentication information transmitted from the terminal to the authentication-information-based cooperation system, and is authentication information transmitted from the authentication-information-based cooperation system to each communication target system.

When an authentication between the authentication-information-based cooperation system and the communication target system has been successful, the communication target system communicates with the authentication-information-based cooperation system while trusting the authentication-information-based cooperation system. Thus, the communication target system communicates with the authentication-information-based cooperation system without verifying the validity of the authentication information transmitted from the authentication-information-based cooperation system.

Here, a communication content transmitted from the terminal to the authentication-information-based cooperation system may include authentication-related information that is related to the authentication information. As described above, each communication target system performs communication while trusting the authentication-related information included in the communication content transmitted from the authentication-information-based corporation system.

Accordingly, the communication target system may allow a communication with the authentication-information-based cooperation system on the basis of the authentication-related information described above, not on the basis of authentication information that has been validly authenticated. When this communication is allowed, an unintended access is performed on the communication target system, which may result in an unauthorized access to the communication target system being successful.

<Example of Overall Configuration of System of According to Embodiments>

Figure 1:
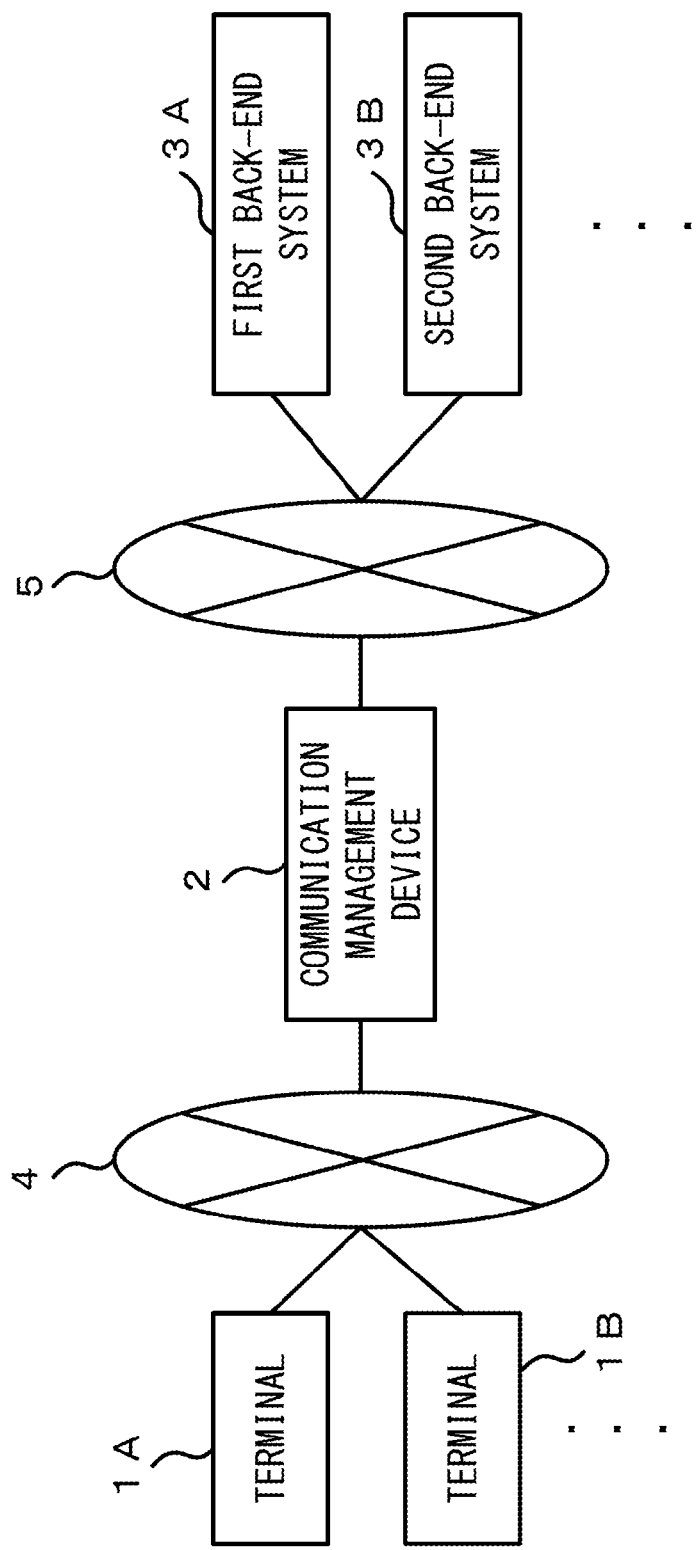
FIG. 1 illustrates an example of an overall configuration of a system according to embodiments.

Embodiments will be described with reference to the drawings. FIG. 1 illustrates an example of an overall configuration of a system according to the embodiments. In the example of FIG. 1, the system includes a plurality of terminals (a terminal LA, a terminal 1B, . . . ), a communication management device 2, and a plurality of back-end systems (a first back-end system 3A, a second back-end system 3B, . . . ).

Each terminal 1 and the communication management device 2 are communicatively connected to each other through a first network 4. The communication management device 2 and each back-end system 3 are communicatively connected to each other through a second network 5. The first network 4 and the second network 5 may be, for example, an Internet network or a dedicated line.

The terminal 1 may be a tablet, or a fixed terminal such as a personal computer. The terminal 1 executes, for example, a prescribed application program (hereinafter referred to as an application). A single terminal 1 or a plurality of terminals 1 may be employed.

The application may be a Hypertext Markup Language (HTML) application. When a user who manipulates a terminal 1 performs a prescribed manipulation on the terminal 1, the terminal 1 receives the manipulation.

The communication management device 2 relays a communication between the terminal 1 and the back-end system 3. The communication management device 2 authenticates a terminal 1, and adds information on an authentication between the communication management device 2 and a destination back-end system 3 to a communication content received from the authenticated terminal 1.

Accordingly, the communication management device 2 establishes an authentication-information-based (access-authentication-information-used) cooperation with the back-end system 3. The communication management device 2 is also referred to as an authentication-information-based cooperation system.

The back-end system 3 receives a prescribed request, performs processing that corresponds to the request, and returns a response. For example, the back-end system 3 may be a server that is included in an intra network in a company and provides a prescribed service to the terminal 1. The back-end system 3 is an example of a communication target system.

The back-end system 3 does not receive a request directly from the terminal 1, but the communication management device 2 relays the request from the terminal 1 and the back-end system 3 receives the request relayed by the communication management device 2.

<Example of Communication Management Device>

Figure 2:
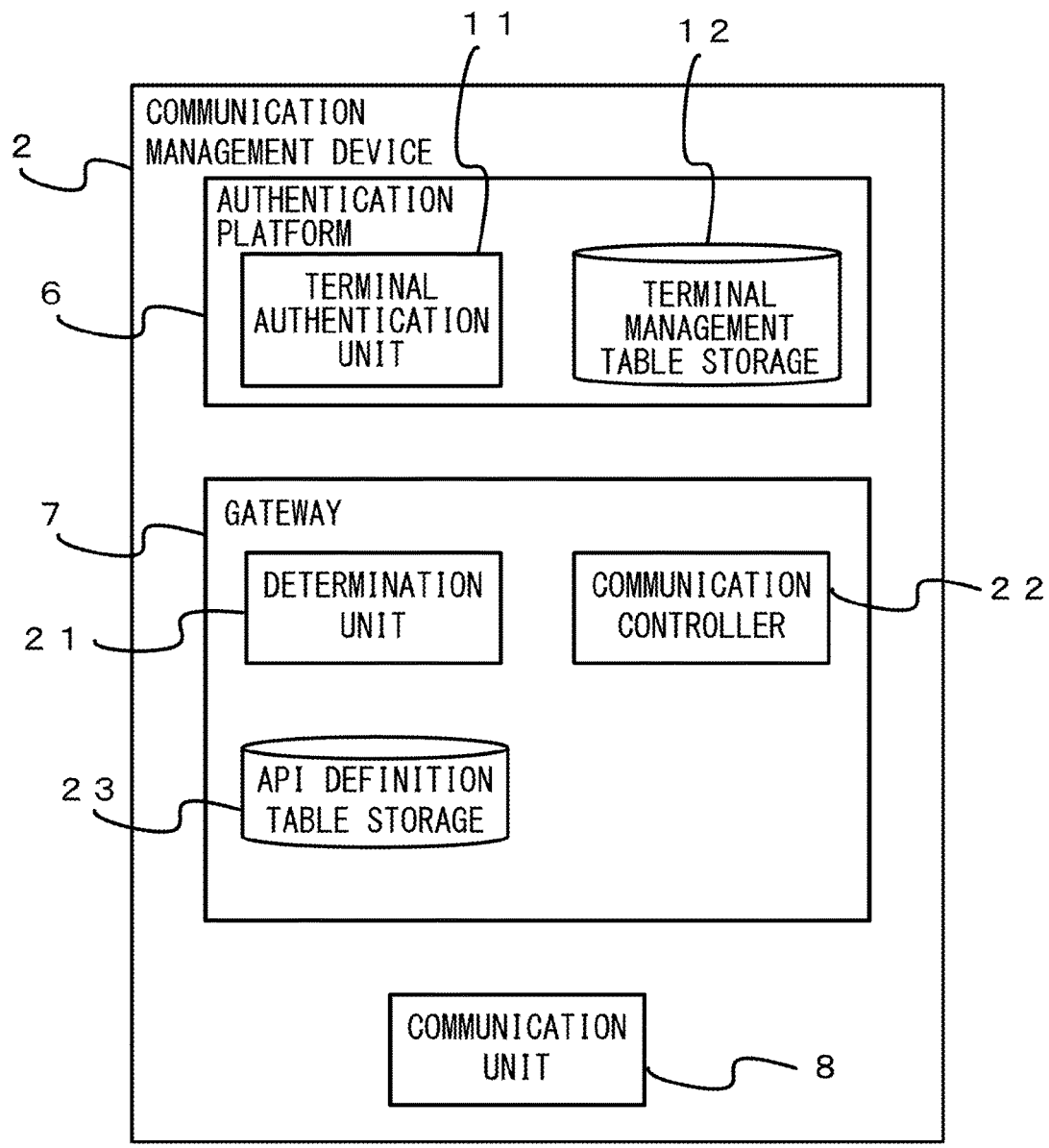
FIG. 2 illustrates an example of a communication management device.

Next, an example of the communication management device 2 is described with reference to FIG. 2. For example, the communication management device 2 provides a cloud service platform. The communication management device 2 includes an authentication platform 6, a gateway 7, and a communication unit 8.

The authentication platform 6 authenticates the terminal 1. The authentication platform 6 is, for example, a cloud service authentication platform. The authentication platform 6 includes a terminal authentication unit 11 and a terminal management table storage 12. The terminal authentication unit 11 performs an authentication in response to a request to authenticate the terminal 1 and returns an authentication token to the terminal 1. Accordingly, the authentication token is added to the terminal 1.

The terminal management table storage 12 stores a correspondence relationship between a user identification (ID) and an authentication token. For example, when the user who manipulates the terminal 1 performs a manipulation of starting a prescribed application, the terminal 1 receives the manipulation.

After the application is started, an application programming interface (API) is called. In the embodiments, when the API is called, the terminal 1 transmits an authentication request destined for the authentication platform 6 of the communication management device 2.

It is assumed that the authentication request includes an ID and a password for authenticating the terminal 1. The authentication request may be information other than an ID or a password. For example, the authentication request may include biometric information.

The terminal authentication unit 11 performs an authentication on the basis of an ID and a password included in an authentication request received from the terminal 1, and transmits an authentication token to the terminal 1 whose validity has been verified. The authentication token is added to the terminal 1 by the terminal 1 receiving the authentication token. The application executed by the terminal 1 recognizes the obtained authentication token.

When the terminal authentication unit 11 transmits the authentication token, the terminal authentication unit 11 associates a user ID identified by a result of the authentication with the transmitted authentication token, and stores them in the terminal management table storage 12. The user ID is an example of identification information.

It is assumed that the user ID described above is different information than the ID included in the authentication request transmitted by the terminal 1, and that the user ID is an ID managed by the communication management device 2.

The gateway 7 relays a communication between the terminal 1 and the back-end system 3. Prescribed processing is performed by the gateway 7 on a communication destined for the back-end system 3 from the terminal 1. The gateway 7 is also referred to as an API gateway.

The gateway 7 includes a determination unit 21, a communication controller 22, and an API definition table storage 23. The determination unit 21 determines whether a communication content (communication data) destined for the back-end system 3 from the terminal 1 includes a parameter (a specific parameter) that is identified by a destination back-end system 3 as information that is added by the communication management device 2.

The communication controller 22 deletes a specific parameter from the communication data destined for the destination back-end system 3 from the terminal 1. Further, the communication controller 22 changes access information on an access to the destination back-end system 3, the access information being included in the communication data destined for the destination back-end system 3 from the terminal 1.

The API definition table storage 23 stores a table (an API definition table) that is referred to when the access information is changed. The communication controller 22 refers to the API definition table and changes the access information.

The communication unit 8 performs communication through the first network 4 or the second network 5. In the example of FIG. 2, the authentication platform 6 and the gateway 7 are included in the communication management device 2. The authentication platform 6 and the gateway 7 may be realized by a virtual machine. Further, the authentication platform 6 and the gateway 7 may be individual devices.

<Example of Tables>

FIG. 3 illustrates an example of a terminal management table that indicates a correspondence relationship between the user ID described above and an authentication token. The terminal management table includes items of "NO. (number)", "USER ID", and "AUTHENTICATION TOKEN". When the terminal authentication unit 11 transmits an authentication token to the terminal 1, the terminal authentication unit 11 associates a number, a user ID, and the authentication token with one another and records them in the terminal management table. It is assumed that the number is a unique natural number for each correspondence relationship.

FIG. 4 illustrates an example of an API definition table stored in the API definition table storage 23. As illustrated in FIG. 4, the API definition table includes items of "NO.", "API ENTRY", "BACK-END URL (uniform resource locator)", and "PARAMETER USED FOR AUTHENTICATION".

The API entry is information that is included in an URL in the communication transmitted from the terminal 1. The back-end URL indicates a URL of a back-end system 3 to be accessed that corresponds to an API entry.

The parameter used for authentication indicates a parameter of a header or a query that is used for authentication when the communication management device 2 establishes an access-authentication-information-used cooperation with the back-end system 3. The communication controller 22 changes access information using a parameter that corresponds to an API entry. The parameter is, for example, a header or a query.

<Example of Flow of Data>

Figure 5:
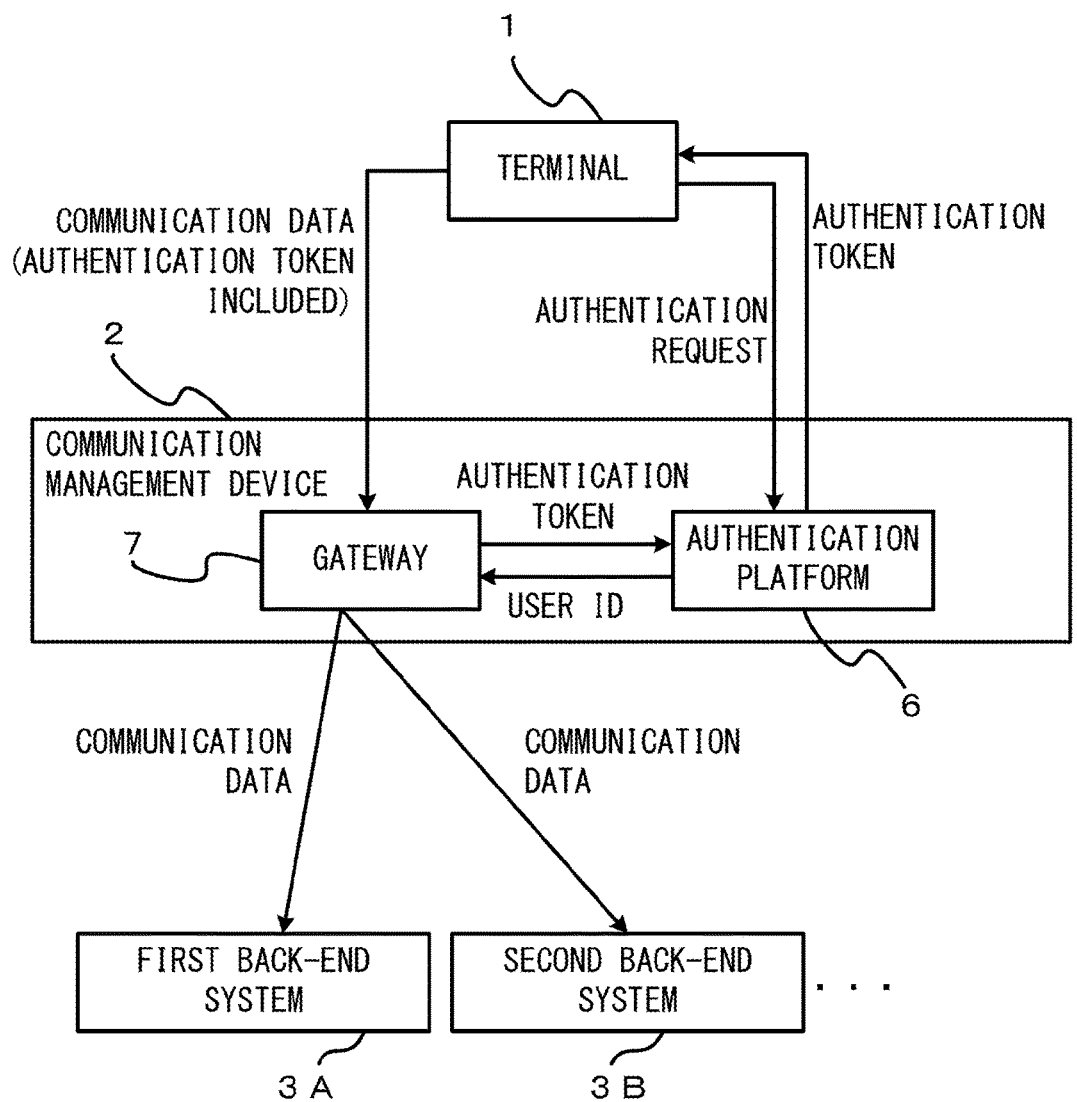
FIG. 5 illustrates an example of a flow of data according to the embodiments.

Next, an example of a flow of data according to the embodiments is described with reference to FIG. 5. The terminal 1 transmits an authentication request to the communication management device 2. The terminal authentication unit 11 performs an authentication on the basis of the authentication request and issues an authentication token. Further, the terminal authentication unit 11 associates the issued authentication token, a user ID, and a number with one another, and records them in the terminal management table.

The issued authentication token is transmitted to the terminal 1. The application executed by the terminal 1 recognizes the authentication token. The application transmits, to the communication management device 2, communication data that includes a URL of the back-end system 3 to be accessed and the authentication token described above.

The communication management device 2 receives the communication data. The gateway 7 recognizes an API entry in the URL included in the communication data. The gateway 7 refers to the API definition table and obtains a back-end URL and a parameter used for authentication that correspond to the API entry.

Further, the gateway 7 recognizes the authentication token included in the received communication data and inquires of the terminal authentication unit 11 about a user ID that corresponds to the authentication token. The authentication platform 6 receives the authentication token from the gateway 7, refers to the terminal management table storage 12, and returns the user ID that corresponds to the received token to the gateway 7.

The communication controller 22 changes access information on an access to the back-end system 3, the access information being included in the communication data received from the terminal 1. As described above, the gateway 7 obtains a back-end URL and a parameter used for authentication that correspond to the API entry.

The communication controller 22 changes, to the back-end URL, the URL included in access information that is included in the communication data received from the terminal 1. Further, when the parameter used for authentication is that of a header, the communication controller 22 deletes the authentication token from the header and adds the parameter of the header and the user ID described above.

When the parameter used for authentication is that of a query, the communication controller 22 deletes the authentication token from the header and adds the parameter of the query and the user ID described above to a portion in the URL that corresponds to the query.

The user ID described above is information that corresponds to the authentication token added to the terminal 1 on the basis of a result of the authentication performed on the terminal 1, and is an example of first information.

The communication controller 22 performs a control to transmit, to a back-end system 3, communication data in which access information has been changed and to which a user ID has been added, the back-end system 3 being a destination of the changed access information. The communication unit 8 transmits the communication data to the back-end system 3.

The back-end system 3 allows an access from the terminal 1 on the basis of the user ID included in the communication data. Accordingly, the terminal 1 logs into the back-end system 3 through the communication management device 2.

The authentication platform 6 manages a plurality of user IDs collectively by associating each of the plurality of user IDs with a corresponding authentication token and by recording them in a terminal management table. If the terminal is authenticated by the authentication platform 6, the terminal 1 will be able to log into each back-end system 3 without any individual authentication.

In other words, after the terminal 1 is authenticated by the authentication platform 6, there is no need for the individual authentication described above because the communication management device 2 performs an authentication between the terminal 1 and each back-end system 3. This results in improving the convenience for a user.

As described above, the authentication platform 6 authenticates the terminal 1. The back-end system 3 authenticates communication data transmitted from the communication management device 2 on the basis of a user ID included in the communication data. Thus, there exist two types of authentication relationships.

After the authentication between the communication management device 2 and the back-end system 3 has been successful and a trust relationship has been established between them, the back-end system 3 will not verify the validity of an individual session because the back-end system 3 trusts a communication from the communication management device 2.

Here, communication data transmitted from the terminal 1 to the communication management device 2 may include authentication-related information on an authentication. For example, a header of the communication data may include authentication-related information in addition to an authentication token. Further, a query of the communication data transmitted from the terminal 1 to the communication management device 2 may include authentication-related information.

When a header or a query of communication data includes authentication-related information that is different from an authentication token, the back-end system 3 may trust the query transmitted from the communication management device 2 on the basis of the authentication-related information.

When the back-end system 3 trusts the communication data on the basis of the authentication-related information described above, a communication based on authentication-related information that has not been validly authenticated is performed. The communication has not been validly authenticated, and this may result in an unauthorized access to the back-end system 3 being successful.

FIG. 6 illustrates examples of communication data transmitted from the terminal 1 to the communication management device 2 and communication data transmitted from the communication management device 2 to the back-end system 3. As illustrated in the example of FIG. 6, a header includes the information "X-API-USERID: gyoumuID" in addition to the authentication token "APIGATEWAY-TOKEN".

In the example of FIG. 6, "https://APIGATEWAY.com" included in a URL that is included in communication data transmitted from the terminal 1 to the communication management device 2 indicates an address of the gateway 7. The remaining portion "myGyoumu" of the URL us called an API entry. The API entry is information that identifies a destination back-end system 3.

The communication controller 22 refers to the API definition table and obtains a back-end URL and a parameter used for authentication that correspond to "myGyoumu". The back-end URL is "https://BACKENDSYSTEM/gyoumu" and the parameter of a header used for authentication is "X-API-USERID".

Further, the communication controller 22 obtains a user ID corresponding to the authentication token "43j; iojrugj98wertjp3j54p94t;sfdjg" from the authentication platform 6. As illustrated in FIG. 3, the user ID corresponding to this authentication token is "user0001".

The communication controller 22 changes the information on a URL to information on a back-end URL, the information on a URL being included in the communication data transmitted from the terminal 1 to the communication management device 2. Further, the communication controller 22 changes the information corresponding to the authentication token to the parameter of a header "X-API-USERID" that is used for authentication, and adds the user ID "user0001" to the communication data, the information corresponding to the authentication token being included in the header of the above-described communication data.

Here, the header of the communication data transmitted from the terminal 1 to the communication management device 2 includes the information "X-API-USERID: gyoumuID". This information is authentication-related information on an authentication. Further, the parameter "X-API-USERID" is the same as a parameter used for authentication that corresponds to the API entry "myGyoumu".

Thus, the back-end system 3 recognizes the parameter described above as a parameter added by the communication management device 2. The parameter recognized by the back-end system 3 as a parameter added by the communication management device 2 is referred to as a specific parameter. The specific parameter is an example of second information.

When the specific parameter "X-API-USERID" is included in a header or a query of communication data transmitted from the communication management device 2 to the back-end system 3, the back-end system 3 trusts the value "gyoumuID" of the specific parameter, and allows a reception of the communication data.

Thus, when a specific parameter is included in a header or a query of communication data transmitted from the terminal 1 to the communication management device 2, the communication controller 22 deletes the specific parameter. The communication controller 22 also deletes a value of the specific parameter in addition to the specific parameter. The communication data transmitted from the communication management device 2 to the back-end system 3 does not include the above-described specific parameter as a result of deleting the specific parameter (and the value of the specific parameter).

Accordingly, an access to the back-end system 3 based on a specific parameter that is not validly authenticated is prevented. The prevention of the access results in enhancing the security of a communication to the back-end system 3.

In the example of the communication data illustrated in FIG. 6, the URL and the header are examples of control data, and the body is an example of actual data.

FIG. 7 illustrates an example in which a specific parameter is included in a query. The URL included in the communication data transmitted from the terminal 1 to the communication management device 2 includes the query "?X-API-USER=gyoumuID". The parameter of the query that is used for authentication and corresponds to the API entry "aaaGyoumu" in the API definition table is "X-API-USER", and this parameter is a specific parameter.

Thus, the communication controller 22 deletes the specific parameter "X-API-USER" and the value "gyoumuID" of the specific parameter.

Then, the communication controller 22 obtains, from the API definition table, each item corresponding to the API entry "aaaGyoumu" included in the URL included in the communication data. The back-end URL corresponding to the API entry "aaaGyoumu" is "BACKENDSYSTEM2/aaa", and the name of the query used for authentication is "X-API-USER".

Further, the communication controller 22 obtains the user ID "user0001" from the authentication platform 6 on the basis of the authentication token. As illustrated in FIG. 7, the communication controller 22 changes the URL and the parameter of the query included in the URL that are included in the communication data.

Then, the communication controller 22 adds the obtained user ID described above to the changed parameter of the query. Further, the communication controller 22 deletes information on an authentication token from the header.

Accordingly, the specific parameter included in the query of the communication data transmitted from the terminal 1 to the communication management device 2 is deleted, and this results in being able to prevent an unintended unauthorized access to the back-end system 3 from being successful.

<Sequence Diagram According to Embodiments>

Figure 9:
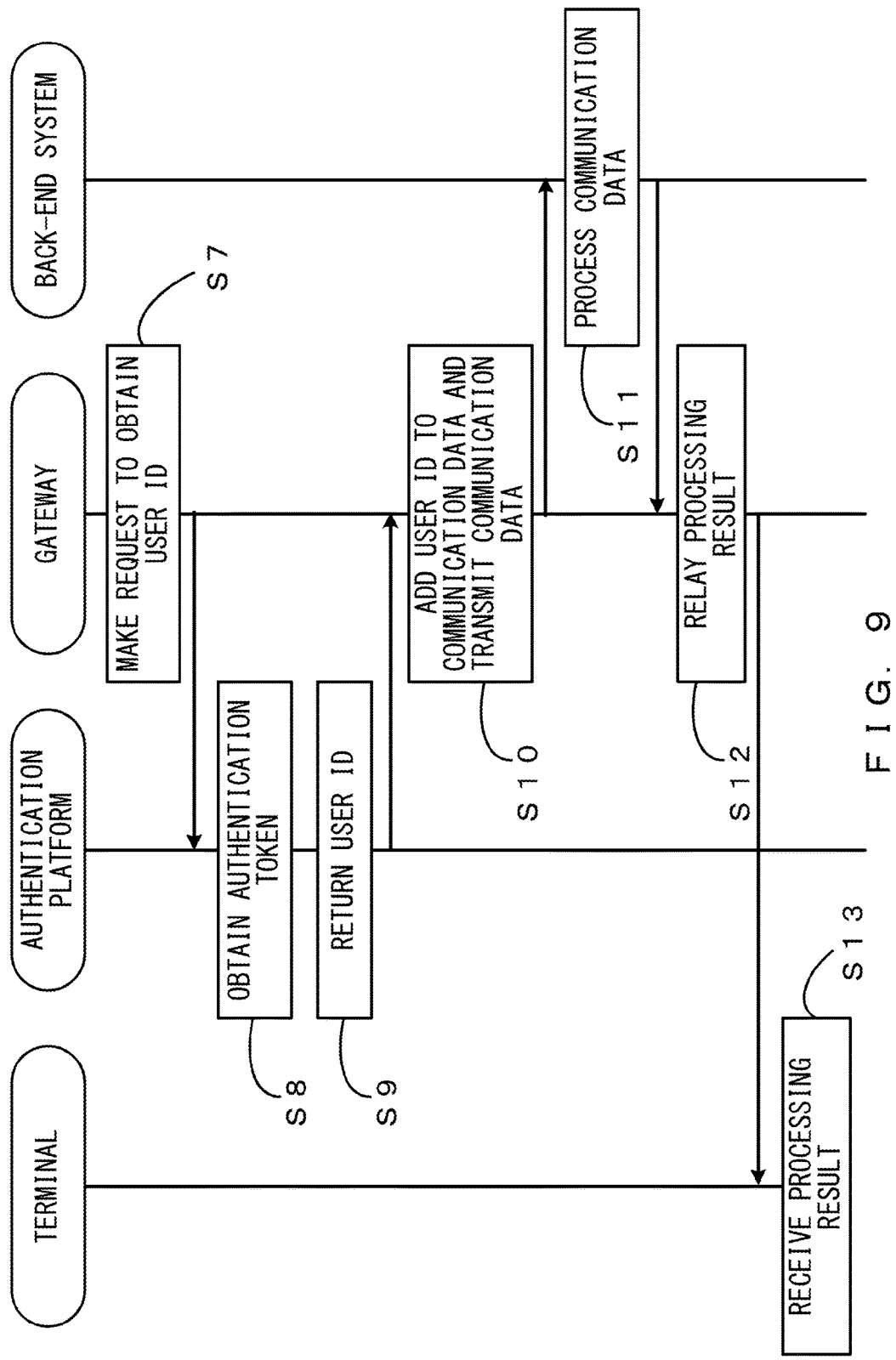
FIG. 9 is part 2 of the sequence diagram that illustrates the example of the flow of the processing according to the embodiments.

Next, a flow of processing according to the embodiments is described with reference to FIGS. 8 and 9. The application executed by the terminal 1 transmits an authentication request to the communication management device 2 (Step S1). The communication management device 2 receives the authentication request.

The terminal authentication unit 11 of the authentication platform 6 performs an authentication on the basis of information (an ID and a password) included in the authentication request, and performs terminal authenticating processing of verifying the validity of the terminal 1 (Step S2).

According to a result of the authentication of the terminal 1, the terminal authentication unit 11 transmits an authentication token to the terminal 1. Further, the terminal authentication unit 11 associates a user ID and the authentication token and records them in a terminal management table.

The application executed by the terminal 1 transmits communication data that includes access information and the added authentication token to the communication management device 2 (Step S3). The communication unit 8 of the communication management device 2 receives the communication data. The determination unit 21 of the gateway 7 determines whether a specific parameter is included in a header or a query of the communication data (Step S4).

When it is YES in Step S4, the communication controller 22 deletes the specific parameter from a header or a query of the communication data transmitted from the terminal 1 (Step S5). When it is NO in Step S4, the process of Step S5 is not performed.

The communication controller 22 refers to the API definition table and obtains API definition information (a back-end URL and a parameter used for authentication) that corresponds to an API entry included in a URL that is included in the communication data transmitted from the terminal 1 (Step S6).

Next, the processes of and after Step S7 are described with reference to FIG. 9. The communication controller 22 of the gateway 7 recognizes the authentication token included in the communication data and makes a request for the authentication platform 6 to obtain a user ID corresponding to the authentication token (Step S7).

The terminal authentication unit 11 refers to the terminal management table and obtains the user ID corresponding to the authentication token (Step S8). Then, the terminal authentication unit 11 returns the obtained user ID to the gateway 7 (Step S9).

The communication controller 22 changes the back-end URL and the parameter of a header or a query that is used for authentication, and adds the user ID returned from the gateway 7 to the changed parameter, the back-end URL and the parameter being obtained on the basis of the API definition information. Then, the communication controller 22 performs a control to transmit, to the back-end system 3, the communication data in which the user ID has been added to the changed parameter (Step S10).

The communication unit 8 transmits the communication data to the back-end system 3. The back-end system 3 receives the communication data. The back-end system 3 performs processing that corresponds to the communication data (request) (Step S11).

The back-end system 3 transmits the processed communication data (response) to the communication management device 2. The communication controller 22 of the communication management device 2 relays the communication data (Step S12) and performs a control to transmit the communication data to the terminal 1.

The communication unit 8 transmits the communication data to the terminal 1. The terminal 1 receives the communication data from the communication management device 2 (Step S13). Accordingly, communication is performed between the terminal 1, the communication management device 2, and the back-end system 3.

Each of the processes described above is realized by, for example, a communication management program executed by the communication management device 2. For example, the addition of a user ID in Step S10 may be realized by the communication management program described above, and the transmission of communication data in Step S10 may be realized by other programs.

<Variation>

Next, a variation is described. FIG. 10 illustrates an example of the communication management device 2 according to the variation. In the communication management device 2 according to the variation, a back-end authentication table storage 24 has been newly added to FIG. 2 of the embodiments described above. The back-end authentication table storage 24 is an example of a storage.

A flow of data is described with reference to an example of FIG. 11. The authentication platform 6 performs an authentication according to an authentication request received from the terminal 1, and transmits an authentication token to the terminal 1. The terminal 1 transmits communication data that includes the authentication token in its header or query to the communication management device 2.

The determination unit 21 of the gateway 7 determines whether the header or the query of the communication data includes a specific parameter. When the header or the query of the communication data includes the specific parameter, the communication controller 22 deletes the specific parameter.

The communication controller 22 recognizes an API entry from a URL included in the communication data received from the terminal 1, refers to the API definition table, and obtains a back-end URL and a parameter of the header or the query that is used for authentication, the back-end URL and the parameter corresponding to the recognized API entry.

FIG. 12 illustrates an example of an API definition table according to the variation. As illustrated in the example of FIG. 12, "PARAMETER USED FOR AUTHENTICATION" includes a user ID and a password. For example, when the number is "1", the parameters used for authentication are a header, and the parameters are "X-API-USERID" and "X-API-USERPASS".

The parameter "X-API-USERID" indicates a parameter of a user ID, and the parameter "X-API-USERPASS" indicates a parameter of a password. In the variation, a user ID and a password are used to perform an authentication between the communication management device 2 and the back-end system 3.

The communication controller 22 obtains, from the authentication platform 6, a user ID that corresponds to an authentication token included in communication data received from the terminal 1. The communication controller 22 refers to a back-end authentication table stored in the back-end authentication table storage 24, and obtains a back-end user ID and a back-end password that correspond to the user ID described above.

FIG. 13 illustrates an example of a back-end authentication table. The back-end authentication table includes items of "NO.", "USER ID", "BACK-END USER ID", "BACK-END PASSWORD", and "BACK-END TOKEN".

The back-end user ID, the back-end password, and the back-end token are information (referred to as back-end authentication information) authenticated by the back-end system 3. Information on each item in the back-end authentication table is held by the back-end system 3. The back-end authentication information is information on an authentication performed between a communication target system and a communication management device.

Thus, the information on each item in the back-end authentication table held by the back-end system 3 may be registered in the back-end authentication table in advance. In the following descriptions, it is assumed that a back-end user ID and a back-end password are used for an authentication between the communication management device 2 and the back-end system 3.

As illustrated in the example of FIG. 11, the gateway 7 transmits communication data to a destination back-end system 3. A header or a query of the communication data includes a back-end user ID and a back-end password. The destination back-end system 3 performs an authentication using the back-end user ID and the back-end password.

As illustrated in the example of FIG. 14, a header of communication data transmitted from the terminal 1 to the communication management device 2 includes "X-API-USERID" and "X-API-USERPASS", which are specific parameters corresponding to the API entry "myGyoumu".

The determination unit 21 determines that the header of the communication data includes a specific parameter. Thus, the communication controller 22 deletes the specific parameter (and a value of the specific parameter).

The communication controller 22 refers to the API definition table, and obtains the back-end URL "https://BACK-ENDSYSTEM/gyoumu" and the parameters "X-API-USERID" and "X-API-USERPASS" that are used in a header, the back-end URL and the parameters corresponding to the API request "myGyoumu".

Then, the communication controller 22 changes the URL and the header of the communication data received from the terminal 1. The communication controller 22 obtains, from the authentication platform 6, a back-end user ID and a back-end password that correspond to the authentication token included in the communication data.

The back-end user ID corresponding to the authentication token "43j;iojrugj98wertjp3j54p94t;sfdjg" is "backendUser0001". Further, the back-end password corresponding to the authentication token described above is "backendPassword0001".

The communication controller 22 adds the obtained back-end user ID to "X-API-USERID" in the header, and adds the obtained back-end password to "X-API-USERPASS" in the header. The communication controller 22 may obtain a back-end token and add the obtained back-end token to the header.

FIG. 15 illustrates an example of the case of a query. The URL of the communication data received from the terminal 1 includes a query. The query includes the specific parameters "X-API-USERID" and "X-API-USERPASS" which correspond to the API entry "aaaGyoumu".

Thus, the communication controller 22 deletes the specific parameters (and the values of the specific parameters). The communication controller 22 refers to the API definition table and obtains a back-end user ID and a back-end user password that correspond to the authentication token.

The obtained back-end user ID is "backendUser0001". The obtained back-end password is "backendPassword0001". The communication controller 22 adds the back-end user ID and the back-end password to the parameters of the query.

Figure 16:
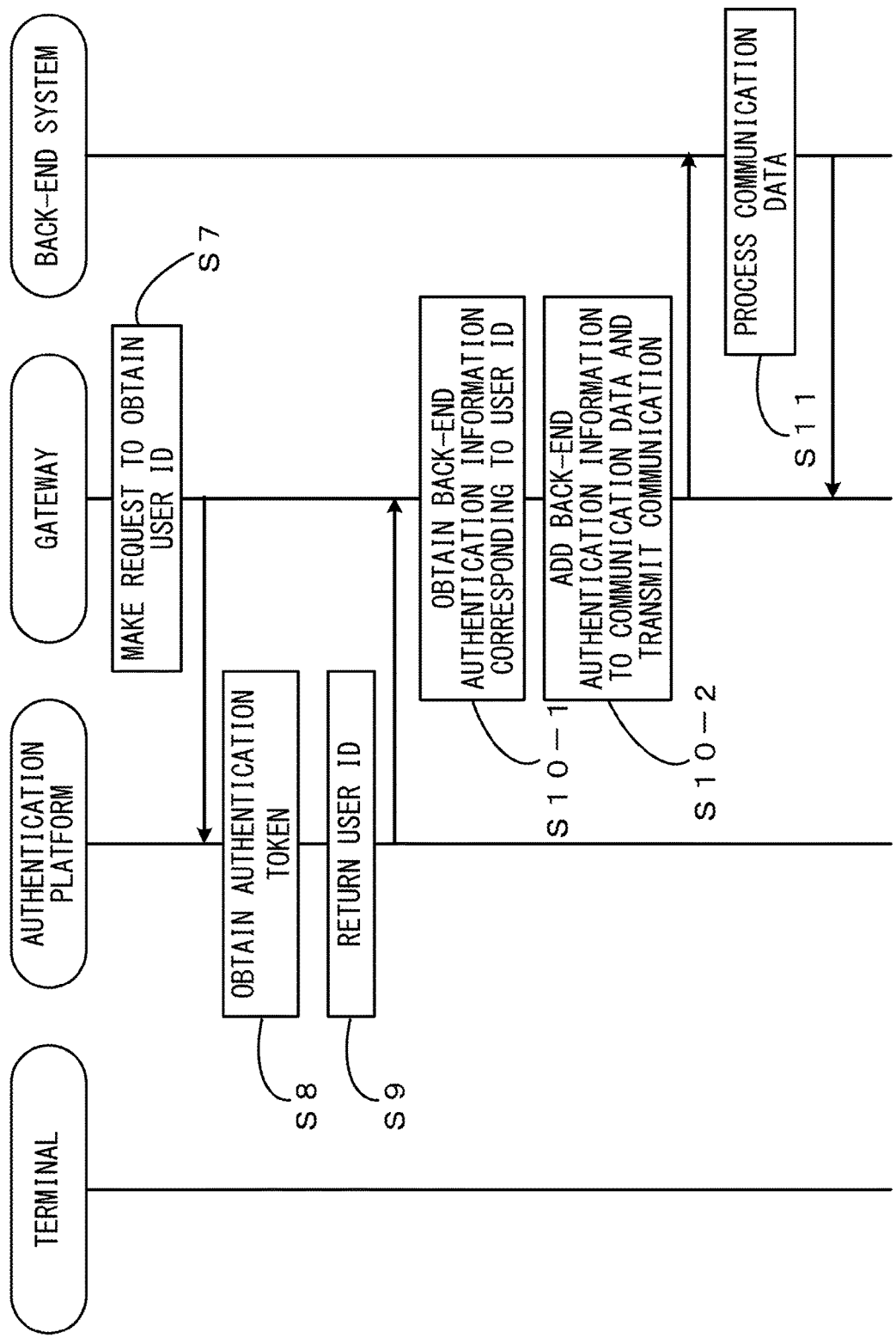
FIG. 16 is a sequence diagram that illustrates an example of a flow of processing according to the variation.

FIG. 16 is a sequence diagram that illustrates a flow of processing according to the variation. The processing according to the variation is different from the processing according to the embodiments descried above in that it includes different processes than the process of Step S10. The processes other than Step S10 are the same as those of the embodiments described above, so the descriptions are omitted.

The communication controller 22 of the gateway 7 obtains, from the back-end authentication table, back-end authentication information corresponding to the user ID returned from the authentication platform 6 (Step S10-1).

Then, the communication controller 22 adds the obtained back-end authentication information to the communication data, and performs a control to transmit the communication data to the back-end system 3. The communication unit 8 transmits the communication data to the back-end system 3 (Step S10-2).

As in the embodiments described above, the addition of back-end authentication information in Step S10-2 may be realized by a communication management program, and the transmission of communication data in Step S10-2 may be realized by other programs.

In the variation, the gateway 7 of the communication management device 2 includes the back-end authentication table storage 24. The back-end authentication table is a table used for an authentication for each back-end system 3.

For example, when the back-end system 3 requests a complicated authentication, it is also possible to deal with the complicated authentication described above by the communication management device 2 that relays a communication between the terminal 1 and the back-end system 3 having a back-end authentication table.

As in the variation, when the back-end system 3 requests for an ID and a password, the communication management device 2 can use the ID and the password as information on an authentication between the communication management device 2 and the back-end system 3. Accordingly, it is also possible to deal with a complicated authentication, which results in further enhancing security.

<Example in which Authentication-Related Information is Included in Header and Query>

Next, the case in which both a header and a query of communication data transmitted from the terminal 1 to the communication management device 2 include authentication-related information on an authentication is described. In the example of FIG. 17, the API entry included in the URL of the communication data transmitted from the terminal 1 to the communication management device 2 is "myGyoumu".

In the API definition table, the "parameter used for authentication" corresponding to the API entry is a header.

The parameter of a back-end user ID is "X-API-USERID", and the parameter of a back-end user password is "X-API-USERPASS".

The parameter "X-API-USERID" and the parameter "X-API-USERPASS" are included in both the header and the query. Further, both of the parameters are authentication-related information on an authentication. As described above, the "parameter used for authentication" corresponding to the API entry is a header.

Thus, the parameter "X-API-USERID" and the parameter "X-API-USERPASS" included in the header are specific parameters that are recognized by the back-end system 3 as information added by the communication management device 2, but the above-described parameters included in the query are not specific parameters. The reason is that the above-described parameters included in the query are not recognized by the back-end system 3 as information added by the communication management device 2.

The determination unit 21 determines that the above-described parameters included in the header are specific parameters and that the above-described parameters included in the query are not specific parameters. Thus, the communication controller 22 deletes the specific parameters included in the header and does not delete the specific parameters included in the query.

The communication controller 22 obtains a user ID that corresponds to the authentication token, refers to the back-end authentication information table, and obtains back-end authentication information that corresponds to the user ID. Then, the communication controller 22 adds the authentication parameters including the back-end authentication information to communication data.

Thus, even when communication data includes a plurality of pieces of authentication-related information, the communication controller 22 only deletes a specific parameter recognized by the back-end system 3 as information added by the communication management device 2. The reason is that a specific parameter that is not recognized by the back-end system 3 as information added by the communication management device 2 is not deleted.

Figure 18:
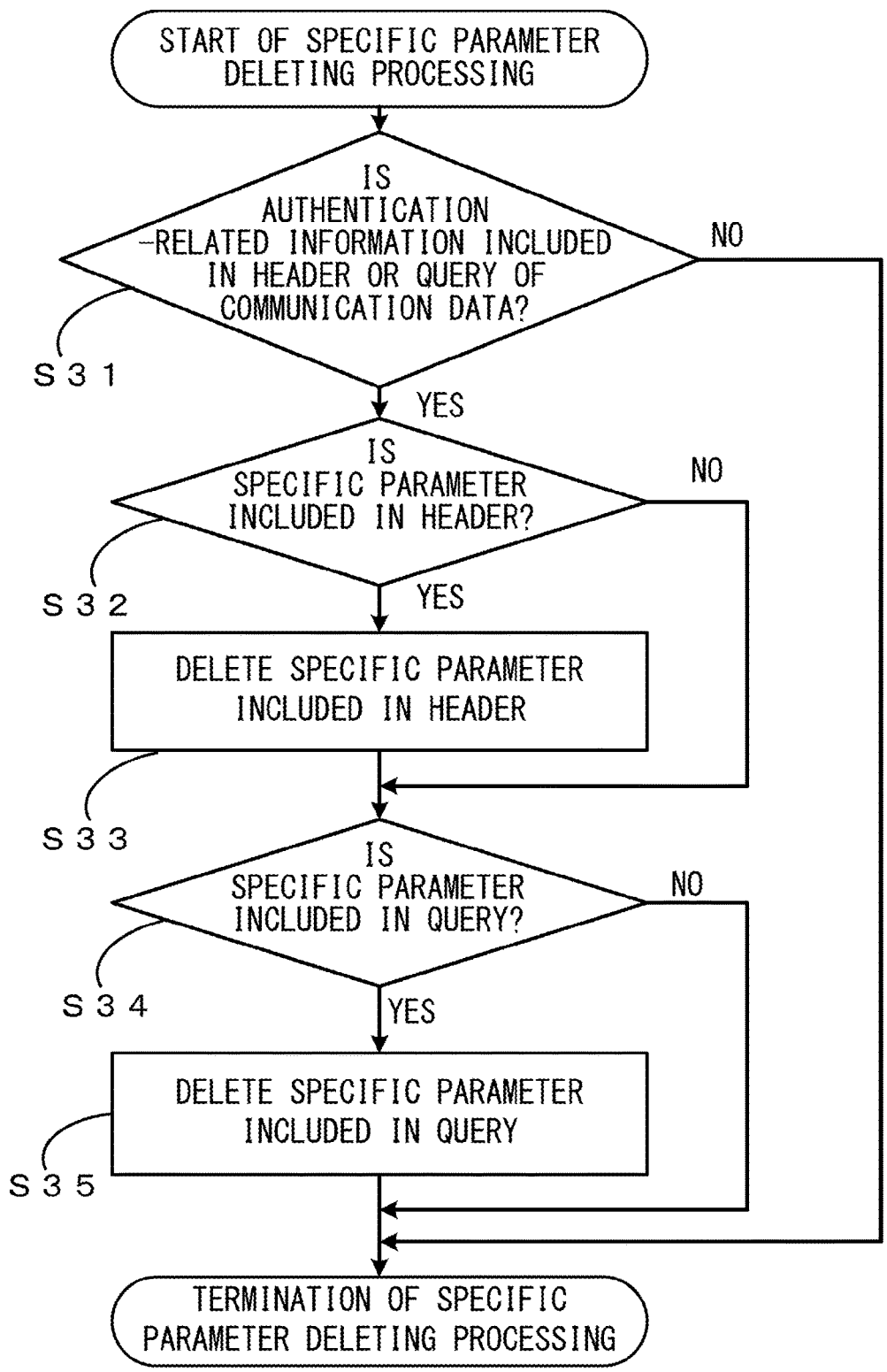
FIG. 18 is a flowchart that illustrates an example of specific parameter deleting processing.

Next, an example of processing of deleting a specific parameter when communication data includes a plurality of pieces of authentication-related information is described with reference to the flowchart of FIG. 18. The determination unit 21 determines whether a header or a query of communication data includes authentication-related information (Step S31).

As described above, communication data includes a URL, a header, and a body. The URL and the header are control data, and the body is actual data. Even when the body includes a specific parameter, an unauthenticated access to the back-end system 3 is less likely to be successful due to the specific parameter.

Thus, when it is NO in Step S31, the processing of deleting a specific parameter is not performed. When it is YES in Step S31, the determination unit 21 determines whether the header includes a specific parameter (Step S32).

When it is YES in Step S32, the communication controller 22 deletes the specific parameter included in the header (Step S33). When it is NO in Step S32, the process of Step S33 is not performed.

The determination unit 21 determines whether the query includes a specific parameter (Step S34). When it is YES in Step S34, the communication controller 22 deletes the specific parameter included in the query (Step S35). When it is NO in Step S34, the process of Step S35 is not performed. The processing of FIG. 18 described above is applied not only to the present variation, but also to the embodiments described above.

<Example of Hardware Configuration of Communication Management Device>

Figure 19:
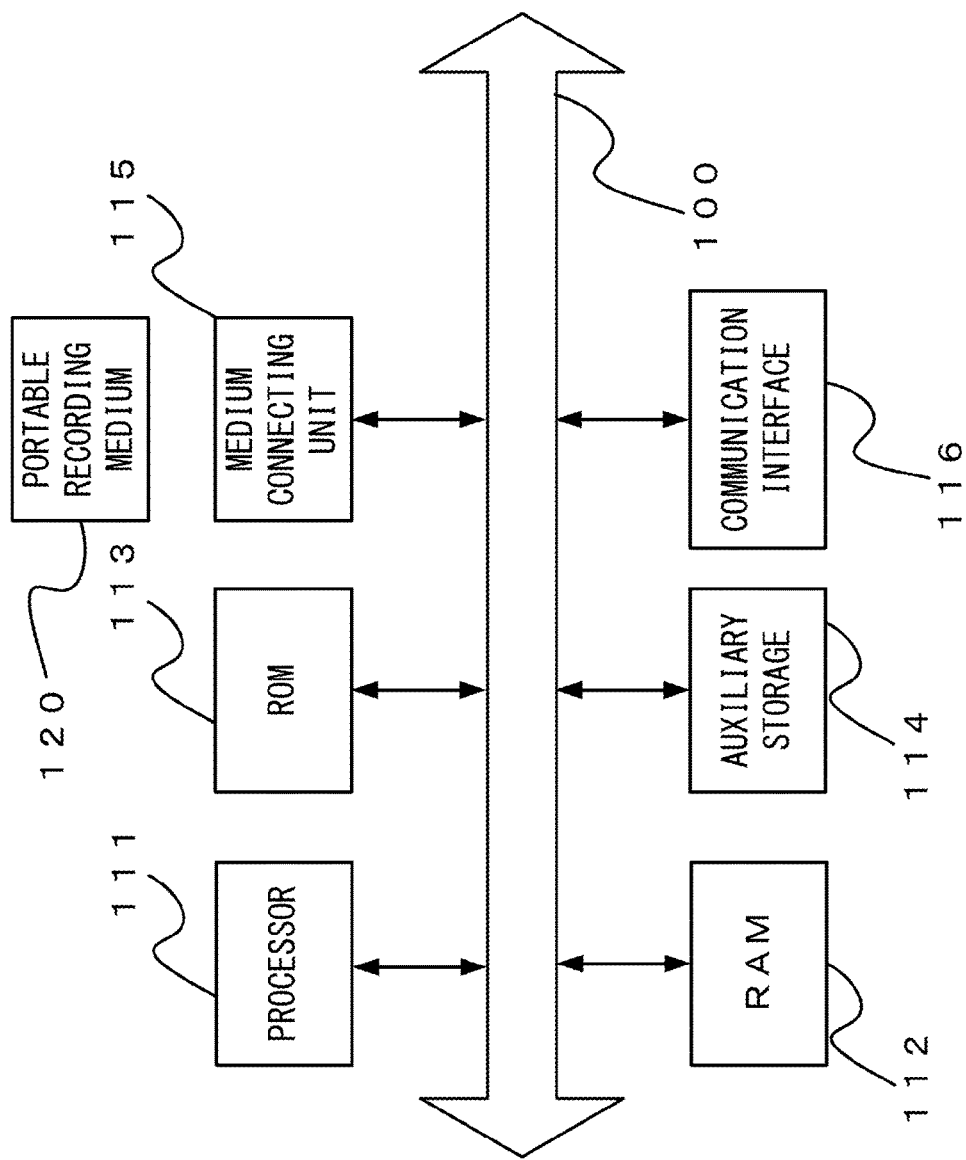
FIG. 19 illustrates an example of a hardware configuration of the communication management device.

Next, an example of a hardware configuration of the communication management device 2 is described with reference to the example of FIG. 19. As illustrated in the example of FIG. 19, a processor 111, a random access memory (RAM) 112, and a read only memory (ROM) 113 are connected to a bus 100. Further, an auxiliary storage 114, a medium connecting unit 115, and a communication interface 116 are connected to the bus 100.

The processor 111 executes a program deployed in the RAM 112. As a program to be executed, a program that performs the processing according to the embodiments may be applied.

The ROM 113 is a nonvolatile storage that stores therein the program deployed in the RAM 112. The auxiliary storage 114 is a storage that stores therein various pieces of information, and, for example, a hard disk drive or a semiconductor memory may be applied as the auxiliary storage 114. The medium connecting unit 115 is provided connectively to a portable recording medium 120.

As the portable recording medium 120, a portable memory (such as a semiconductor memory) or an optical disk (such as a compact disc (CD) and a digital versatile disc (DVD)) may be applied. A program that performs the processing according to the embodiments may be recorded in the portable recording medium 120.

The communication unit 8 included in the communication management device 2 may be realized by the communication interface 116. The terminal management table storage 12, the API definition table storage 23, and the back-end authentication table storage 24 may be realized by, for example, the RAM 112 or the auxiliary storage 114.

The terminal authentication unit 11, the determination unit 21, and the communication controller 22 may be realized by the processor 111 executing a provided program.

All of the RAM 112, the ROM 113, the auxiliary storage 114, and the portable storage medium 120 are examples of a computer-readable tangible storage medium. These tangible storage media are not a transitory medium such as a signal carrier.

According to the embodiments, it is possible to enhance security in a communication from a terminal when an access-authentication-information-used cooperation with a communication target system is established.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recoding medium having stored therein a communication management program that causes a communication management device to execute a process comprising:

authenticating a terminal in response to an authentication request from the terminal;

adding an authentication token to the terminal according to the result of the authenticating;

receiving a communication content destined to a communication target system, the communication target system sharing access-authentication information with the communication management device;

adding a first information to the communication content, the first information corresponding to the authentication token and including information on an authentication performed between the communication target system and the communication management device;

detecting whether the communication content includes a second information that is identified by the communication target system as information added by the communication management device;

deleting the second information from the communication content when it is detected that the second information is included in the communication content received from the terminal; and transmitting the communication content, to which the first information is added, to the communication target system.

2. The non-transitory computer-readable recoding medium according to claim 1, wherein a storage that stores a correspondence relationship between identification information that corresponds to the authentication token and information on an authentication performed between the communication target system and the communication management device is referred to, and the information on an authentication performed between the communication target system and the communication management device which corresponds to the identification information is obtained; and the first information including the obtained authentication information is added to the communication content.

3. The non-transitory computer-readable recoding medium according to claim 2, wherein the information on an authentication performed between the communication target system and the communication management device which corresponds to the identification information includes an ID and a password.

4. The non-transitory computer-readable recoding medium according to claim 1, wherein when the communication content includes a plurality of pieces of authentication-related information on an authentication, only the second information is deleted from among the plurality of pieces of authentication-related information.

5. The non-transitory computer-readable recoding medium according to claim 1, wherein when the second information is included in control data from among the control data and actual data that are included in the communication content, the second information is deleted.

6. The non-transitory computer-readable recoding medium according to claim 1, wherein when a header and a query that are included in the communication content include a plurality of pieces of authentication-related information on an authentication, the second information is deleted from only one of the header and the query.

7. A communication management method conducted by a communication management device, the communication management method comprising:

authenticating a terminal in response to an authentication request from the terminal;

adding an authentication token to the terminal according to the result of the authenticating;

receiving a communication content destined to a communication target system, the communication target system sharing access-authentication information with the communication management device;

adding a first information to the communication content, the first information corresponding to the authentication token and including information on an authentication performed between the communication target system and the communication management device;

detecting whether the communication content includes a second information that is identified by the communication target system as information added by the communication management device;

deleting the second information from the communication content when it is detected that the second information is included in the communication content received from the terminal; and transmitting the communication content, to which the first information is added, to the communication target system.

8. A communication management device communication management device comprising:

a hardware processor configured to execute a process including:

authenticating a terminal in response to an authentication request from the terminal;

adding an authentication token to the terminal according to the result of the authenticating;

receiving a communication content destined to a communication target system, the communication target system sharing access-authentication information with the communication management device;

adding a first information the communication content, the first information corresponding to the authentication token and including information on an authentication performed between the communication target system and the communication management device;

detecting whether the communication content includes a second information that is identified by the communication target system as information added by the communication management device;

deleting the second information from the communication content when it is detected that the second information is included in the communication content received from the terminal; and transmitting the communication content, to which the first information is added, to the communication target system.

* * * * *